(12) United States Patent
King

(10) Patent No.: US 8,371,063 B2
(45) Date of Patent: Feb. 12, 2013

(54) SUCTION MOUNTED INSECT ERADICATOR

(75) Inventor: Jason Edward King, Ogden, UT (US)

(73) Assignee: Jason King, Weston, ID (US)

( * ) Notice: Subject to any disclaimer, the term of this patent is extended or adjusted under 35 U.S.C. 154(b) by 173 days.

(21) Appl. No.: 12/948,745

(22) Filed: Nov. 17, 2010

(65) Prior Publication Data
US 2012/0117854 A1    May 17, 2012

(51) Int. Cl.
*A01M 1/22*    (2006.01)
(52) U.S. Cl. .......................................... 43/112
(58) Field of Classification Search .................. 43/112, 43/132.1, 133, 138, 119
See application file for complete search history.

(56) References Cited

U.S. PATENT DOCUMENTS

| 907,570 | A | | 12/1908 | Cheney et al. |
| 974,785 | A | | 11/1910 | Frost |
| 1,629,816 | A | * | 5/1927 | Carlson ........................... 43/131 |
| 1,754,748 | A | | 4/1930 | Frost |
| 1,953,622 | A | | 7/1932 | Marsel |
| 1,882,550 | A | | 10/1932 | Frost |
| 1,895,570 | A | | 1/1933 | Frost |
| 2,177,846 | A | | 1/1935 | Swangren |
| 2,030,310 | A | | 2/1936 | McWilliams et al. |
| 2,165,560 | A | | 7/1939 | Luther |
| 2,475,181 | A | | 7/1948 | Gardenhour |
| 2,835,071 | A | * | 5/1958 | Partridge ......................... 43/112 |
| 3,346,988 | A | * | 10/1967 | Pickering ........................ 43/112 |
| 3,464,144 | A | | 9/1969 | Kennett |
| 4,959,923 | A | | 10/1990 | Aiello |
| 5,519,963 | A | | 5/1996 | Shih |
| 6,105,306 | A | | 8/2000 | Teng |
| 6,874,273 | B1 | * | 4/2005 | Weisenburg, III .............. 43/112 |
| 2005/0274060 | A1 | * | 12/2005 | Lederle et al. ............... 43/132.1 |

FOREIGN PATENT DOCUMENTS
WO    WO2010015884    2/2010

* cited by examiner

*Primary Examiner* — Kimberly Berona
*Assistant Examiner* — Danielle Clerkley

(57) ABSTRACT

This device consists of a portable frame of non-conductive material that has a plurality of separate grids of conductive material. The grid is broken into two or three separate pieces depending on the model. The first piece is the positive electric potential, the second is the negative electric potential and the third, (if used) is the grounded safety shield. The apparatus attaches to a surface, such as a window, mirror, wall, etc, via devices that connect to the frame such as: suction cups, hooks, dowels, etc. Power the electric grid is provided using either 110VAC or batteries. A removable tray is located at the base of the grid to catch dead insects for convenient disposal.

6 Claims, 6 Drawing Sheets

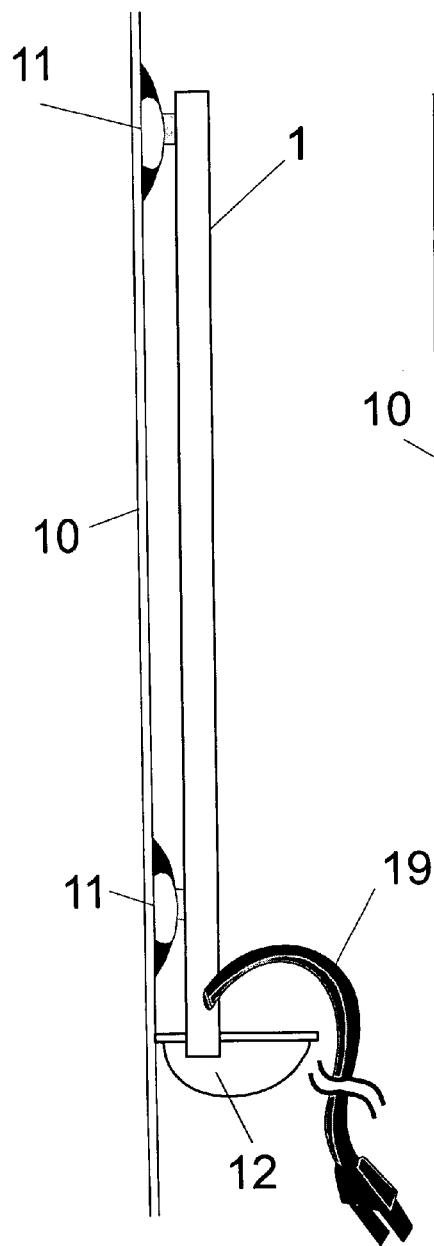
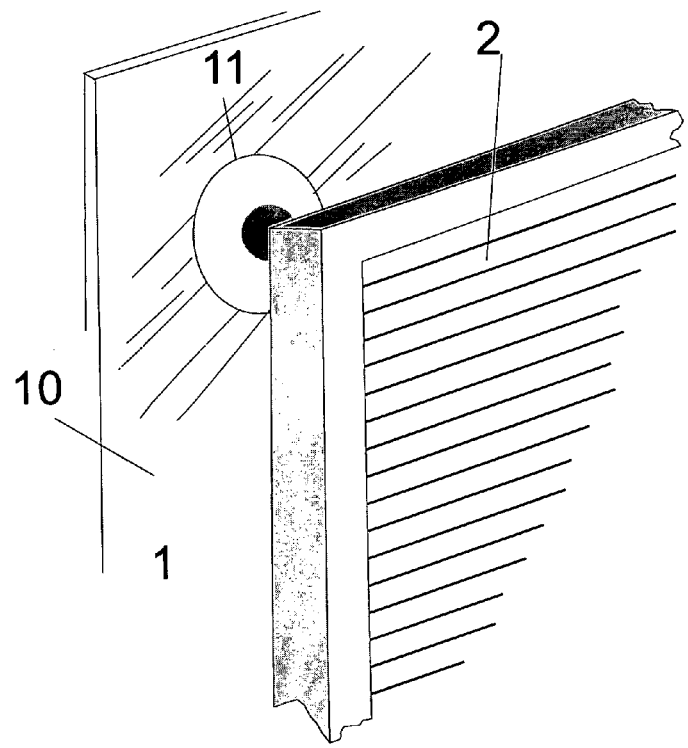
Fig. 3
Fig. 2

SUCTION MOUNTED INSECT ERADICATOR

CROSS REFERENCE TO RELATED APPLICATION

Provisional Application Number 61-281,419

BACKGROUND

Previously, insects were dispatched a variety of different ways: fly swatter, newspaper, and recently, the electric fly swatter, U.S. Pat. No. 5,519,963. The problem with each of these methods is that it is time consuming and there is a good chance of being unsuccessful in your endeavor. Other devices are designed to kill insects outside an enclosure that insects are trying to enter, such as: the hanging electric bug zapper, U.S. Pat. No. 4,182,069; or the portable window unit for killing insects, U.S. Pat. No. 6,874,273. Other devices are designed for indoor use; however, they have inferior insect attracting qualities such as the UV high source trap, electric, U.S. Pat. No. 4,959,923. Others are unsightly and disgusting to deal with such as: window strips and fly paper. Others offer similar window eradicating qualities; however, they lack portability and reasonable cost.

SUMMARY

In accordance with one embodiment, this portable electrical grid is designed to be mounted in various locations. The most suitable locations to eradicate insects are on windows and mirrors, where insects are typically drawn to.

ADVANTAGES

Several advantage of one or more aspects include:
a. Provides the best in the most meaningful location for the eradication of insects.
b. Provides the best device to various locations
c. Provides ease of insect disposal
d. Accomplishes its task in a more efficient, safe and timely manner
e. Adaptable to various enclosure situations

DRAWING REFERENCE NUMERALS

Parts List

Figure 1:
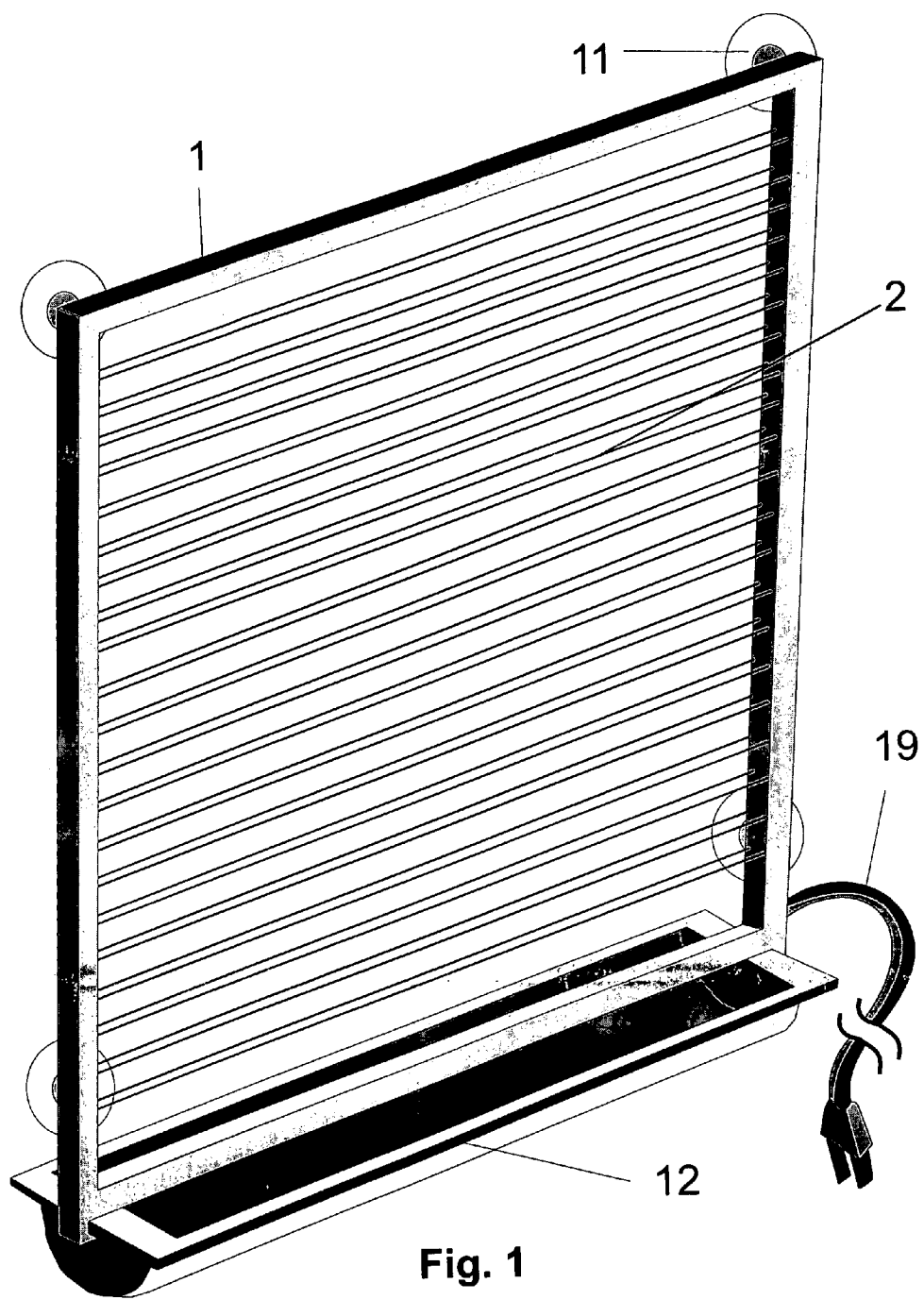
FIG. 1—Perspective Front View
FIG. 2—Side View
FIG. 3—Suction Cup Attaching Frame to Glass
FIG. 4—Bottom of Frame with Insect Catch Tray
FIG. 5—Bottom of Frame with Insect Catch Tray Inserted
FIG. 6—Perspective Sectional View
FIG. 7—Alternative Embodiment Grid Configuration
FIG. 8—Removable Battery Power Source Assembly
FIG. 9—Removable Cord For 110 VAC Power Source Assembly
Figure 4:
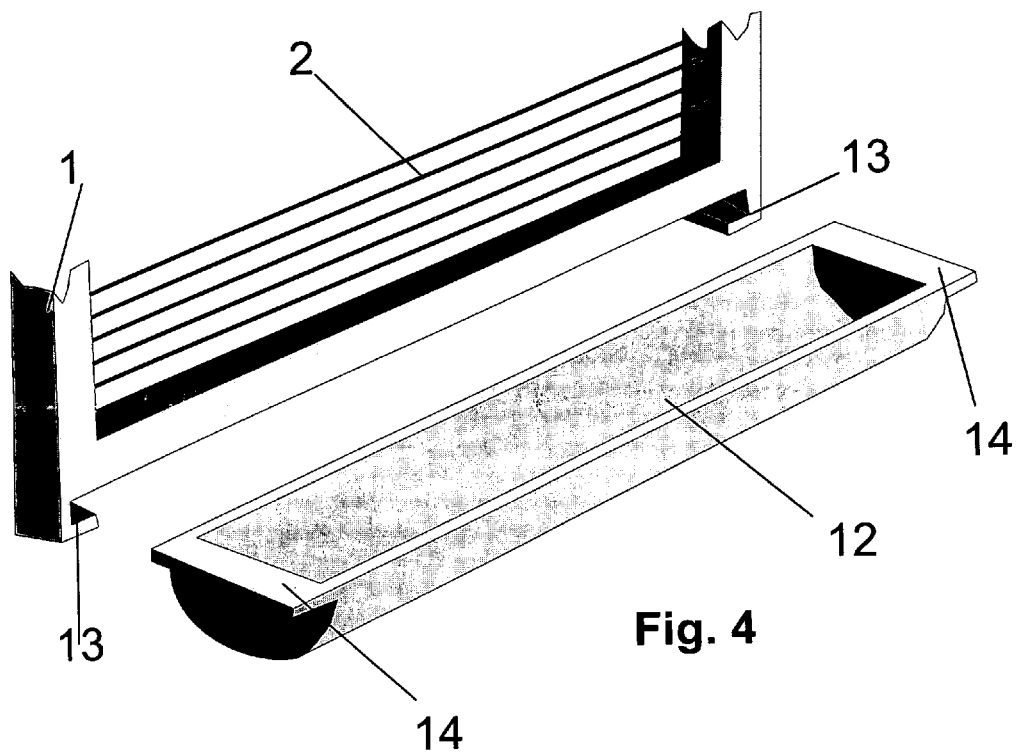
Figure 5:
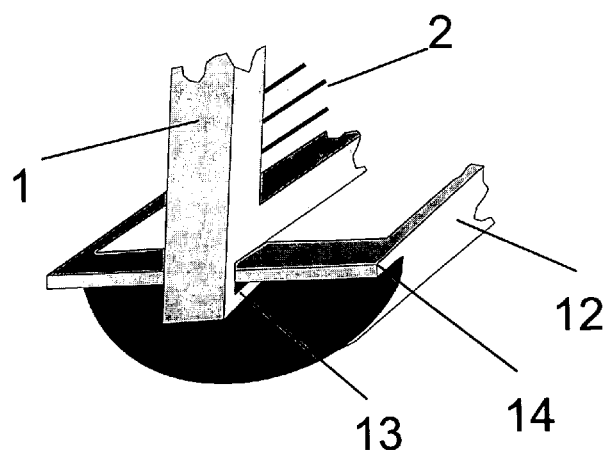
Figure 6:
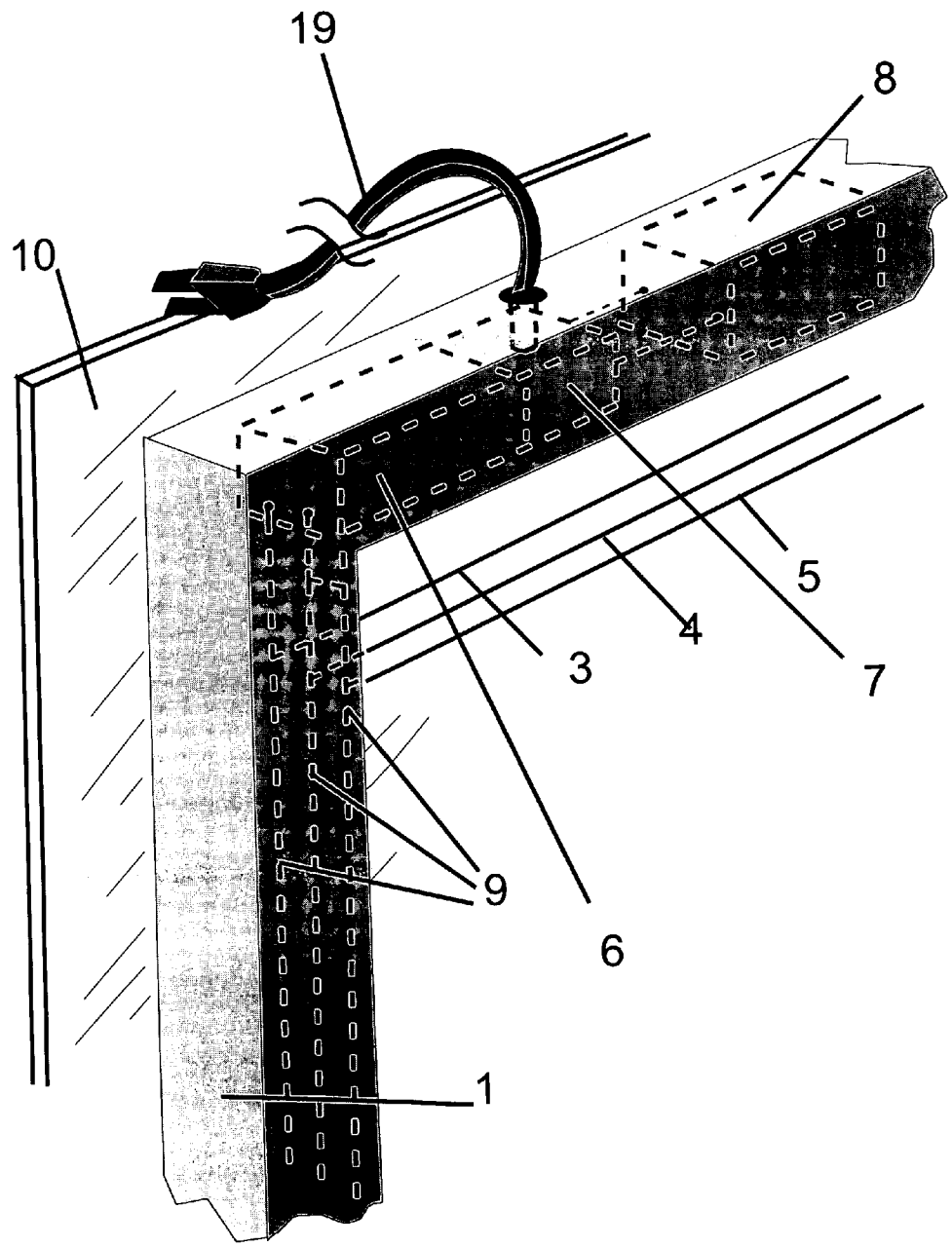
Figure 7:
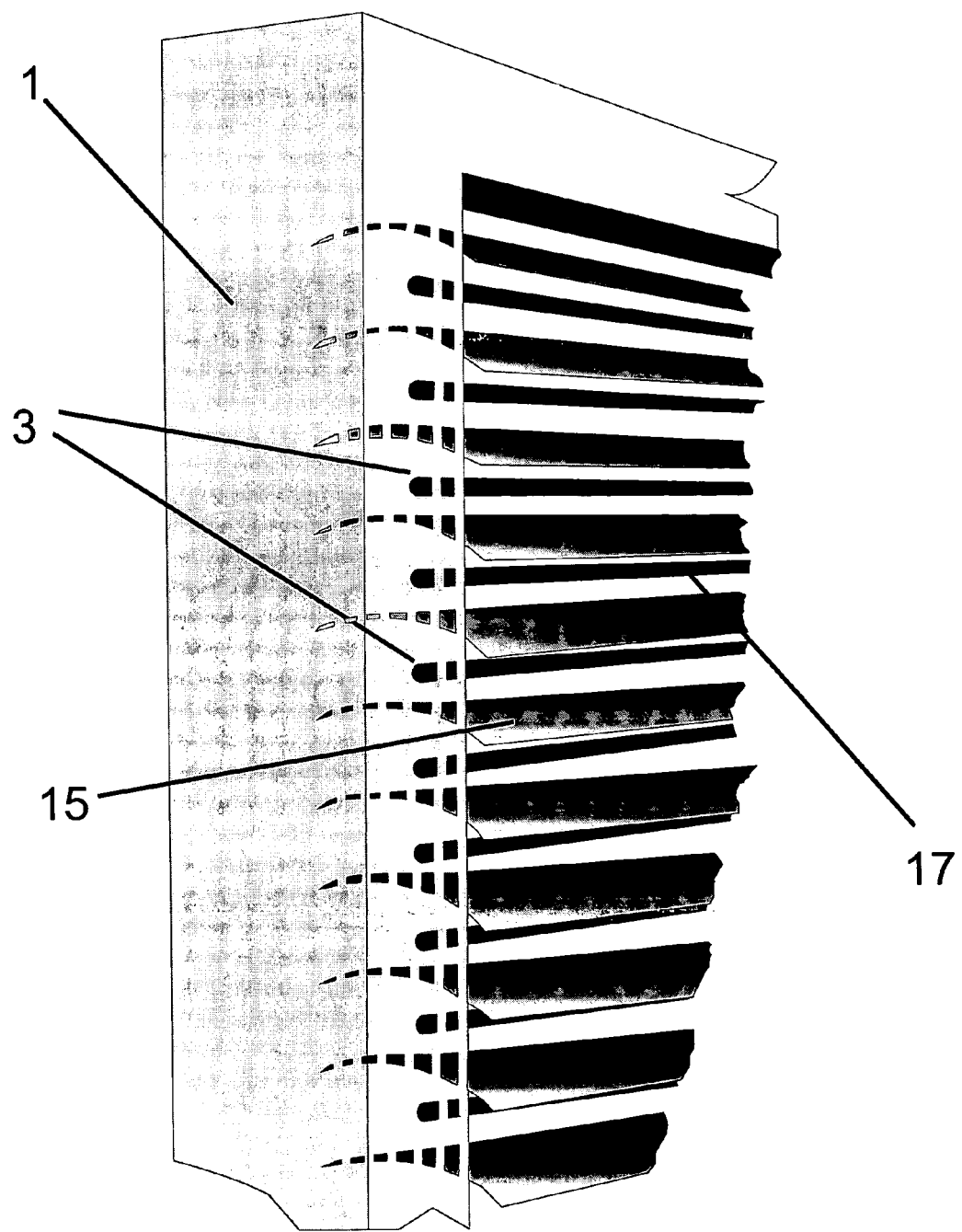
Figure 8:
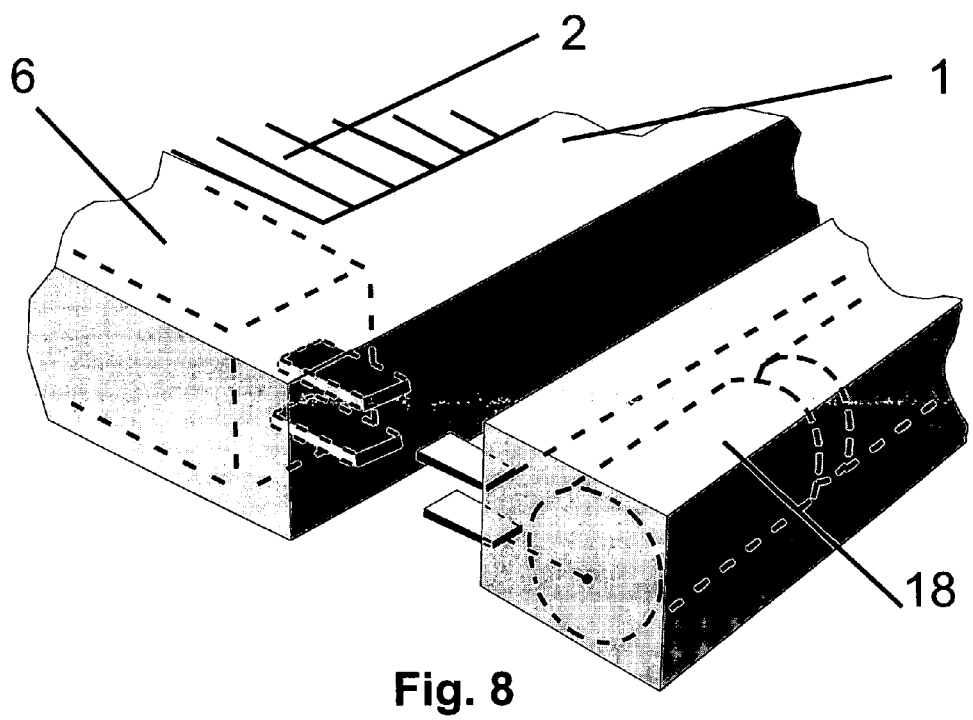
Figure 9:
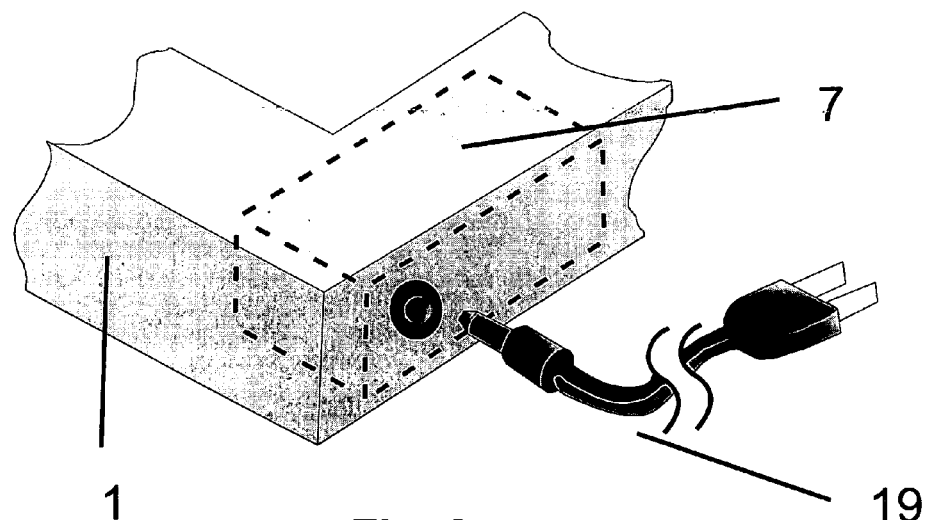

1. Frame
2. Wire grid
3. First set of wires (positive)
4. Second set of wires (negative)
5. Third set of wires (negative)
6. Transformer assembly
7. 110 VAC power source assembly
8. Battery housing assembly
9. Circuit leads
10. Glass or mirror
11. Suction cups
12. Insect catch tray
13. Hook molded in frame
14. Tray flanges
15. Louver grid design
16. Wire grid (positive)
17. Louver (negative)
18. Removable battery power source assembly module
19. Removable electrical cord with plug

CONCLUSION, RAMIFICATION AND SCOPE

Accordingly, the reader can see that according to one embodiment of the invention, I have provided a device that can be easily moved to any necessary location and is a sensible economic solution to insect problems.

While the above description contains many specificities, these should not be construed as limitations on the scope of any embodiments but as exemplifications thereof. Many other ramifications and variation are possible within the teachings of various embodiments. For example; installation location, power supply, size and shape of framework, safety barriers, the shape of the grid as well as installation hardware options.

Thus the scope should be determined by the appended claims and their legal equivalents, and not by the examples given.

Specifications

DETAILED DESCRIPTION

Suction Mounted Insect Eradicator has a frame 1 of non-electric conductive material. Plastic is the preferred choice, however, other materials can also be used; such as: wood and other composites. The shape of the frame can vary as in sizes and dimensions as well as colors. Inside the framework is a three wire grid 2 spaced evenly apart in relation to one another. Set one 3 is located near the glass side of the frame and is positively charged. The second 4 and third 5 sets of the three set grid are situated directly in front of the first and are spaced evenly to provide the ground plane for the apparatus. A transformer or similar device 6 located within the frame 1 and is powered by an optional 110 VAC power source assembly 7 or by a battery power source assembly 8 located within the frame and possibly of various sizes, or both. Circuit leads 9 coming from the transformer connect to the wire grid to provide insect eradication zapping power. Power output to the grid can vary accordingly to accommodate the different model applications.

The frame 1 is attached to a smooth surface such as glass or a mirror 10 by suction cups 11 or other surfaces using the hook mounting assembly. These mounting devices are preferably arranged on the back of the frame near the corners, although can be attached where necessary to accommodate the shape of the frame and/or mounting surface.

This embodiment shows the adjustable, removable insect catch tray 12. The preferred material again is plastic; however, it can be made of various other materials. The tray is attached in this embodiment by hooks 13 molded to the frame that the end flanges of the tray 14 can slide into snugly. The tray can also be attached in many other ways.

Operation

Operation of this device is simple; first, choose a window, mirror or other smooth surface in a location where insects tend to congregate and/or annoy. Second, adhere the device to a window, mirror or other smooth surface. Third, plug it in, if using 110 VAC or turn it on if using battery power. Empty insect catch tray as needed. If the device is needed in another location, remove it from the chosen surface and adhere it wherever it is deemed necessary.

DETAILED DESCRIPTION SECOND EMBODIMENT

The second embodiment is similar to the first. However the conductive wire grid matrix is replaced with a wire louver design 15. The wire portion is the positive electric potential 16 while the louvers 17 are the neutral electrical potential and safety shield. Attaching and powering the embodiment is the same as the first.

Other embodiment options include: lights on the frame, removable plug-in battery power source assembly module 18 and removable electrical cord with plug 19.

I claim:

1. A device for dispatching insects by means of electrocution comprising:
    (a) a frame of non-electrically conductive material arranged in a predetermined manner;
    (b) a plurality of electrically conductive materials made up of both positively and negatively charged materials arranged in a predetermined grid matrix, wherein said positively and negatively charged materials of the grid matrix comprises a vertically alternating louver and wire assembly;
    (c) a means to provide electricity to said electrically conductive material selected from the group consisting of transformers;
    (d) a means to provide electricity to said transformer group; and
    (e) a means to attach said frame onto a smooth surface selected from the group consisting of a window, a glass surface and a mirrored surface.

2. The device of claim 1, wherein said means to provide electricity to said transformer group is selected from the group consisting of removable and non-removable battery power sources.

3. The device of claim 2, wherein said means to provide electricity to said transformer group is a 110 volt alternating current power source assembly.

4. The device of claim 3, wherein a removable plug-in cord provides electricity to said 110 volt alternating current power source assembly.

5. The device of claim 1, wherein said means to attach said frame is a plurality of suction devices arranged in a predetermined manner.

6. The device of claim 1, further comprising a removable insect catch tray.

* * * * *